United States Patent
Gopinath et al.

(10) Patent No.: US 10,198,327 B1
(45) Date of Patent: Feb. 5, 2019

(54) METHOD AND SYSTEM FOR PERFORMING GROUP RECOVERY FROM A RECOVERY SOURCE TO MULTIPLE RECOVERY TARGETS

(71) Applicant: EMC Corporation, Hopkinton, MA (US)

(72) Inventors: Ajith Gopinath, Bangalore (IN); Kishore Kumar, Bangalore (IN); Sathyamoorthy Viswanathan, Kancheepuram Dist (IN)

(73) Assignee: EMC IP Holding Company LLC, Hopkinton, MA (US)

(*) Notice: Subject to any disclaimer, the term of this patent is extended or adjusted under 35 U.S.C. 154(b) by 102 days.

(21) Appl. No.: 14/861,858

(22) Filed: Sep. 22, 2015

(51) Int. Cl.
G06F 11/14 (2006.01)

(52) U.S. Cl.
CPC ...... *G06F 11/1471* (2013.01); *G06F 11/1446* (2013.01); *G06F 2201/85* (2013.01)

(58) Field of Classification Search
CPC ........... G06F 11/1402; G06F 11/1446; G06F 11/148; G06F 11/1451; G06F 11/1458; G06F 11/1464; G06F 11/1469; G06F 11/1471; G06F 2201/84; Y10S 707/99953; Y10S 707/99955
See application file for complete search history.

(56) References Cited

U.S. PATENT DOCUMENTS

| | | | | |
|---|---|---|---|---|
| 6,959,368 B1* | 10/2005 | St. Pierre | ............ | G06F 11/1448 711/100 |
| 7,685,460 B1* | 3/2010 | Bingham | ............ | G06F 11/1469 714/6.11 |
| 8,959,061 B1* | 2/2015 | Dutch | ................. | G06F 11/1415 707/686 |
| 9,910,740 B1* | 3/2018 | Akanda | ............... | G06F 11/1458 |
| 2004/0187104 A1* | 9/2004 | Sardesai | .................. | G06F 8/60 717/174 |
| 2005/0216911 A1* | 9/2005 | Yen | ........................... | G06F 8/60 717/176 |
| 2014/0351220 A1* | 11/2014 | Debate | ............... | G06F 11/1415 707/654 |

* cited by examiner

*Primary Examiner* — Gabriel Chu
(74) *Attorney, Agent, or Firm* — Womble Bond Dickinson (US) LLP

(57) ABSTRACT

A method for recovering data from one or more storage systems for a group recovery. In response to receiving a request for the group recovery, the method implemented at a backup server identifies a group recovery resource based on the request, where the group recovery resource includes one or more recovery item lists. The backup server traverses the one or more recovery item lists of the group recovery resource to determine a source recovery storage system, target recovery storage systems, and one or more data items to be recovered to each of the target recovery storage systems. The backup server then initiates one or more recovery sessions to recover the one or more data items from the source recovery storage systems to the recovery target storage systems substantially concurrently.

18 Claims, 15 Drawing Sheets

500

In response to receiving a request for a group recovery, identify a group recovery resource based on the request, wherein the group recovery resource includes a plurality of recovery item lists.
505

Traverse the plurality of recovery item lists of the group recovery resource to determine a source recovery storage system, a plurality of target recovery storage systems, and one or more data items to be recovered to each of the target recovery storage systems.
510

Initiate a plurality of recovery sessions to recover the one or more data items from the source recovery storage systems to the plurality of recovery target storage systems substantially concurrently.
515

FIG. 5

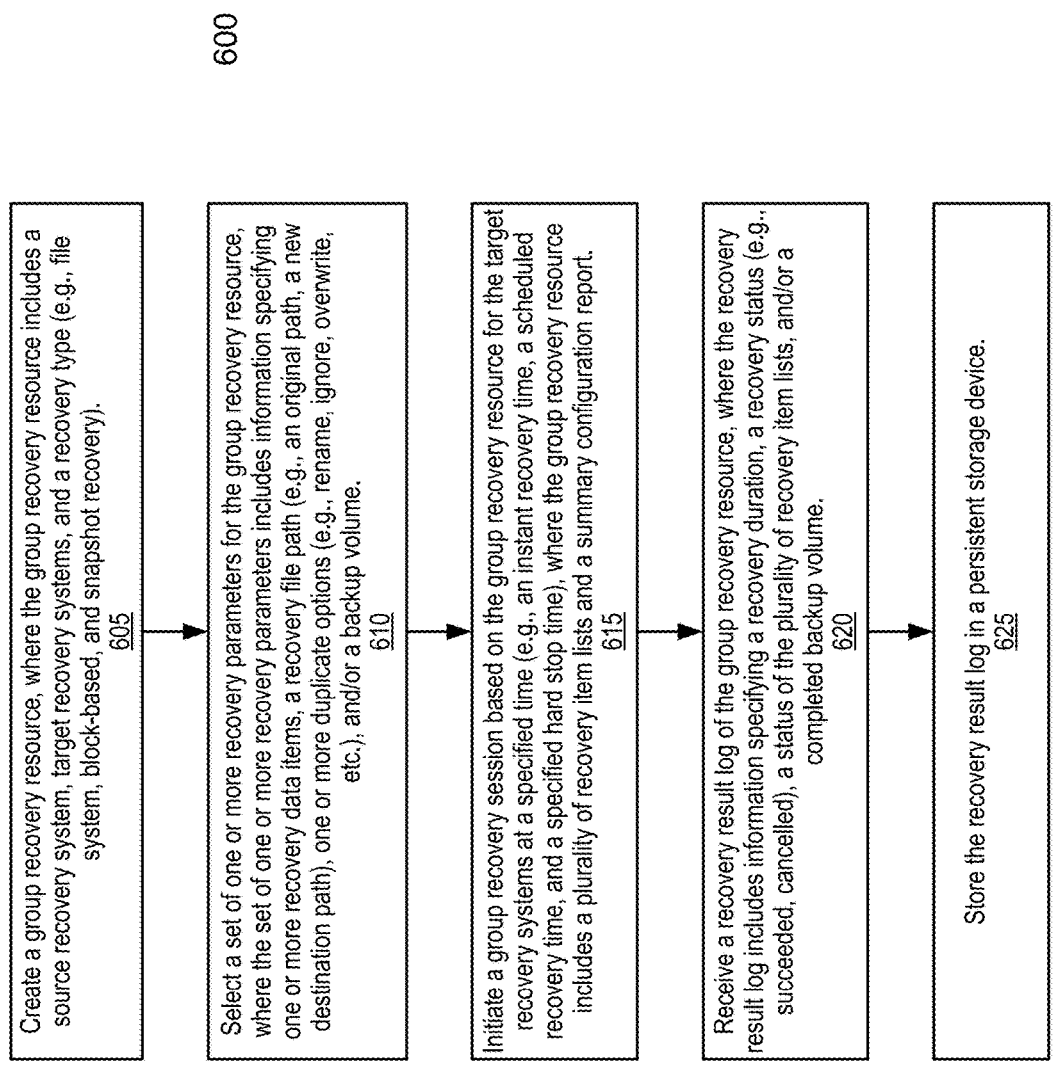

METHOD AND SYSTEM FOR PERFORMING GROUP RECOVERY FROM A RECOVERY SOURCE TO MULTIPLE RECOVERY TARGETS

FIELD OF THE INVENTION

Embodiments of the present invention relate generally to data storage systems. More particularly, embodiments of the invention relate to performing a group recovery to backup and recover multiple data items from multiple storages systems for multiple clients.

BACKGROUND

Enterprises utilize backup storage systems to protect data on their computer systems from loss by copying the data of the computer system and storing it at the backup storage system. The process relies on a client application being executed at each computer system to be backed up to the backup storage system. The client marshals the data to be backed up and transmits it to a backup server that stores it in a set of storage devices local to or in communication with the backup server. Clients may also utilize a backup administrator to handle the backup and recovery process for each client.

Typically, the backup administrator handles data recovery for each client individually, even if the backup administrator handles data recovery for multiple clients. Handling the backup and data recovery process for each machine of a client individually is resource intensive, time consuming, and becomes unwieldy cumbersome from a backup administrator's perspective as the number of clients the administrator handles increases.

It has been a lack of an efficient mechanism to allow backup systems to initiate efficient data recovery for multiple clients from multiple storage systems. Conventional mechanisms are no longer sufficient to satisfy the resource utilization and data recovery concerns of such environments, especially in a multi-client environment.

BRIEF DESCRIPTION OF THE DRAWINGS

Embodiments of the invention are illustrated by way of example and not limitation in the figures of the accompanying drawings in which like references indicate similar elements.

FIG. 5 is a flow diagram illustrating a method for data recovery from a storage system according to one embodiment of the invention.

FIG. 6 is a flow diagram illustrating a method for configuring a group recovery according to one embodiment of the invention.

DETAILED DESCRIPTION

Figure 1:
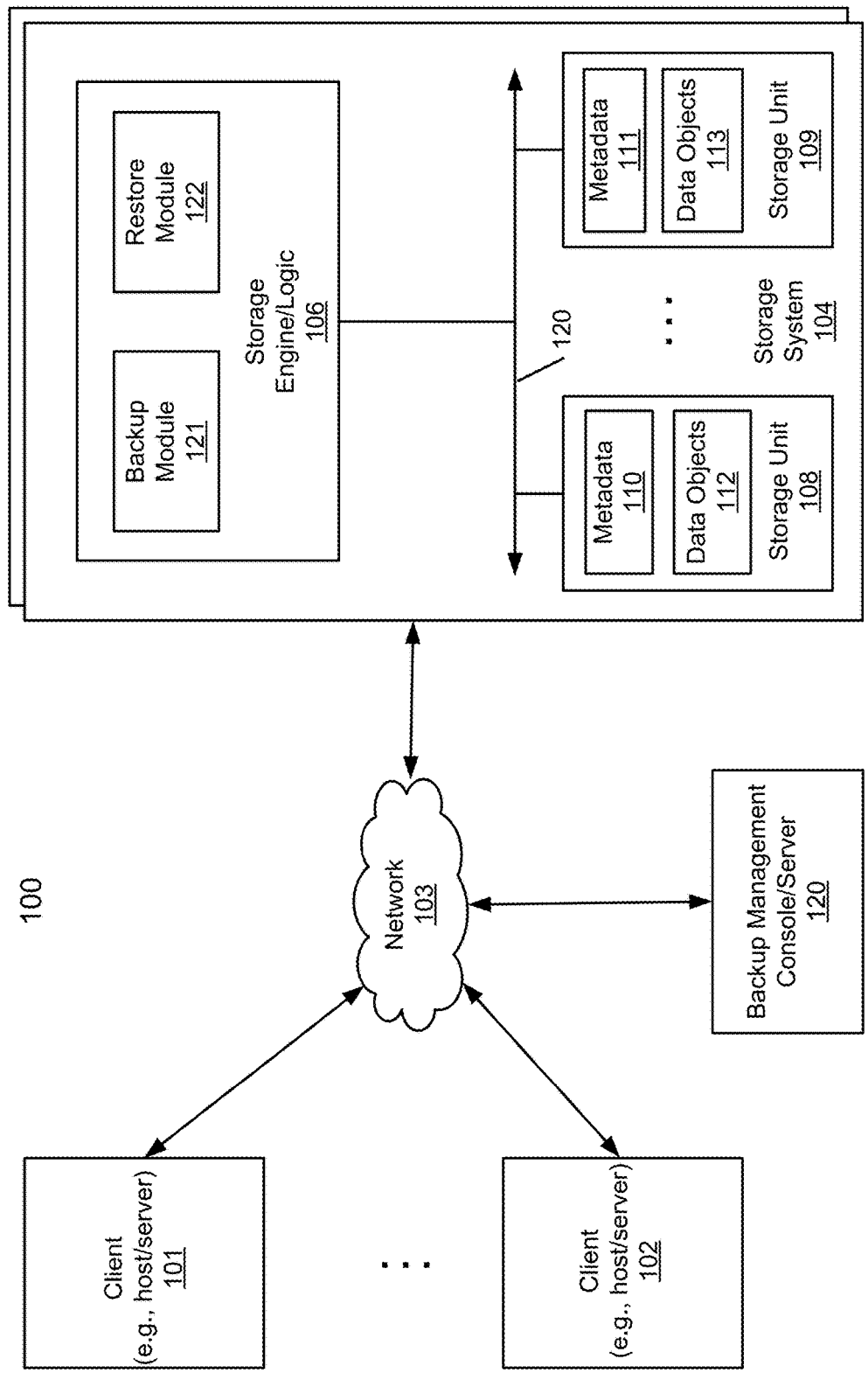
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Bracketed text and blocks with dashed borders (e.g., large dashes, small dashes, dotdash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The embodiments can be implemented in numerous ways, including as a process, an apparatus, a system, a composition of matter, a computer readable medium such as a computer readable storage medium or a computer network wherein program instructions are sent over optical or communication links. A component such as a processor or a memory described as being configured to perform a task includes a general component that is temporarily configured to perform the task at a given time and/or a specific component that is manufactured to perform the task. In general, the order of the steps of disclosed processes can be altered within the scope of the invention.

Reference in the specification to "data items" means one or more data files or data file locations (such as file directories) stored on a client computer that have been collectively selected to be recovered to a storage system. For example, data items may be recovered by a group recovery resource, which includes one or more recovery item lists, and each recovery item list includes one or more data items that are selected by a client (described in further detail below). Further, a data file can be any type of data file, such as a document file, a image file, an audio file, a video file, a multimedia file, a database or other data structure, a program source code file, an executable program file, a website front-end or back-end component file, a markup file, or any other type of data file that can be stored in a non-transitory computer readable medium.

Reference in the specification to "backup data", "data recovery", or "backup and recovery operations" means a wide array of operations that can include, but are not limited to, backing up data or recovering backed up data. Further, reference in the specification to a "group recovery" means a wide array of operations that can include, but are not limited to, backing up data for multiple clients, recovering backed up data for multiple clients, or requesting to recover data items for multiple clients. For example, these backup and recovery operations can be configured and initiated by backup management server 120 (described in further detail below). These terms can also refer, for example, to destructively rolling back to a previously backed up state, purging or deleting backups, editing a backup retention and expiration policy, cloning a backup, staging (cloning to another device) a backup, renaming or otherwise editing metadata for a backup, receiving or sending a report or notification relating to the status of a backup operation, searching for specific data, and searching for a specific backup. This list of possible backup and recovery operations is exemplary and not intended to be exhaustive.

Embodiments of the present invention address a backup management server that provides data recovery from storage systems. The embodiments deal generally with a request for a group recovery, and identifying a group recovery resource based on the request, in which each group recovery resource contains one or more recovery item lists. Further, the embodiments also deal generally with running a backup or recovery operation (such as a recovery session) to recover one or more selected data items from a source recovery storage system to one or more recovery target storage systems based on the identified group recovery resource.

According to some embodiments, a backup management server (also referred to as a backup management console, or simply as a backup server) is utilized to recover data using a group recovery resource, which can accommodate data recovery for multiple clients (e.g., hosts, servers, etc. as recovery targets) and multiple recovery item lists substantially at the same time. According to one aspect of the invention, in response to a request received for a group recovery, the backup management server identifies a group recovery resource based on the request, in which the group recovery resource includes one or more recovery item lists. The backup management server traverses the one or more recovery item lists of the group recovery resource to determine a source recovery storage system, one or more target recovery storage systems, and one or more data items that are to be recovered to each of the target recovery storage systems. The backup management server then initiates one or more recovery sessions to recover the one or more data items from the source recovery storage systems to the one or more recovery target storage systems substantially concurrently.

FIG. 1 is a block diagram illustrating a storage system according to one embodiment of the invention. As used herein, a "group recovery resource" refers to a backup and recovery operation to retrieve data (such as a file, an object, a list, or a directory of one or more files, objects, lists, etc. that have been previously backed up) for multiple clients substantially concurrently. Alternatively, a group recovery resource can refer to a service (e.g., software as a service, storage as a service) provided by a server or a cluster of one or more servers associated with a service provider. Referring to FIG. 1, system 100 includes, but is not limited to, one or more client systems 101-102 communicatively coupled to storage system 104 and backup management console/server 120 (hereinafter, "backup management server 120") over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 and backup management server 120 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof) and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup module 121 (also referred to as backup logic) and restore logic 122 (also referred to as restore logic). Backup module 121 is configured to receive and back up data from a client (e.g., clients 101-102) and to store the backup data in any one or more of storage units 108-109. Restore module 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). In one embodiment, storage units 108-109 stores, but is not limited to, metadata 110-111 and data objects 112-113. Storage units 108-109 may include a single storage device such as a hard disk, a tape drive, a semiconductor memory, multiple storage devices such as a redundant array system (e.g., a redundant array of independent disks (RAID)), and a system for storage such as a library system or network attached storage system, or any other appropriate storage device or system. Some of storage units 108-109 may be located locally or remotely accessible over a network.

In response to a data file (e.g., a backup file) to be stored in storage units 108-109, according to one embodiment, deduplication logic (not shown) may be configured to segment the data file into multiple segments (also referred to as chunks) according to a variety of segmentation policies or rules. In the event that deduplication logic chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. Data stored in the file storages may be stored in a compressed form (e.g., lossless compression: Huffman coding, Lempel-Ziv Welch coding; delta encoding: a reference to a chunk plus a difference, etc.). In one embodiment, different storage devices may use different compression methods (e.g., main or active file storages from other file storages, one file storage from another file storage, etc.). The metadata, such as metadata 110-111, may be stored in at least some of storage units 108-109, such that files can be accessed independent of another storage unit. Metadata of each storage unit includes enough information to provide access to the files it contains.

In one embodiment, metadata may include fingerprints contained within data objects 112-113, where a data object may represent a data chunk, a compression region (CR) of data chunks, or a container of one or more CRs. Fingerprints are mapped to a particular data object via metadata 110-111, enabling the system to identify the location of the data object containing a chunk represented by a particular fingerprint.

In one embodiment, the metadata, such as metadata 110-111, information includes a file name, a storage device where the chunks associated with the file name are stored, reconstruction information for the file using the chunks, and any other appropriate metadata information. In one embodiment, a copy of the metadata is stored on a storage device for files stored on a storage device so that files that are stored on the storage device can be accessed using only the information stored on the storage device. In one embodiment, a main set of metadata information can be recovered/reconstructed by using information of other storage devices associated with the storage system in the event that the main metadata is lost, corrupted, damaged, etc. Metadata for a storage device can be recovered/reconstructed using metadata information stored on a main storage device or other storage device (e.g., replica storage device). Metadata information further includes index information (e.g., location information for chunks in storage devices, identifying specific data objects, etc.).

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by backup management server 120 or an administrator of backup management server 120 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by the administrator or automatically by the storage manager based on a set of software-defined policies. Each of the virtual storage resources can be provisioned to provide a particular type of storage services (e.g., file-based, block-based, object-based, snap-shot based, or HDFS) to a client based on a storage policy or service level agreement associated with that particular client as part of software-defined storage services.

Backup management server 120 may be any type of servers or a cluster of one or more servers used for data recovery. Backup management server 120 may be configured to communicate with each of the storage systems, in this example, storage system 104, to configure the storage systems and collect data from them. Backup management server 120 may be associated with a storage provider such as EMC® Corporation that provides the storage appliances such as storage system 104. Backup management server 120 may further manage many of the storage appliance devices of FIG. 1. Backup management server 120 can collect various data from the storage appliance devices and analyze them. In one embodiment, backup management server 120 can also, based on the analysis, configure or reconfigure any of the storage appliance devices by sending the configuration information (e.g., in a form of script, extensible markup language or XML) to the devices over a network, such as network 103. Such operations can be performed dynamically without having to shut down or disrupt operations of the storage appliance devices. Note that some functionality of storage engine 106 as described above may be implemented within backup management server 120. Similarly, certain functionalities of backup management server 120 may be integrated with storage system 104.

Note that some or all of the components as shown and described above (e.g., storage service engine 106 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

The configuration shown in FIG. 1 shall be referenced throughout the description. Throughout the description, references are made to IDs for clients, recovery data, source hosts, destination hosts, recovery item lists, and group recovery resources. It shall be understood that these IDs may be Universally Unique IDs (UUIDs).

Figure 2:
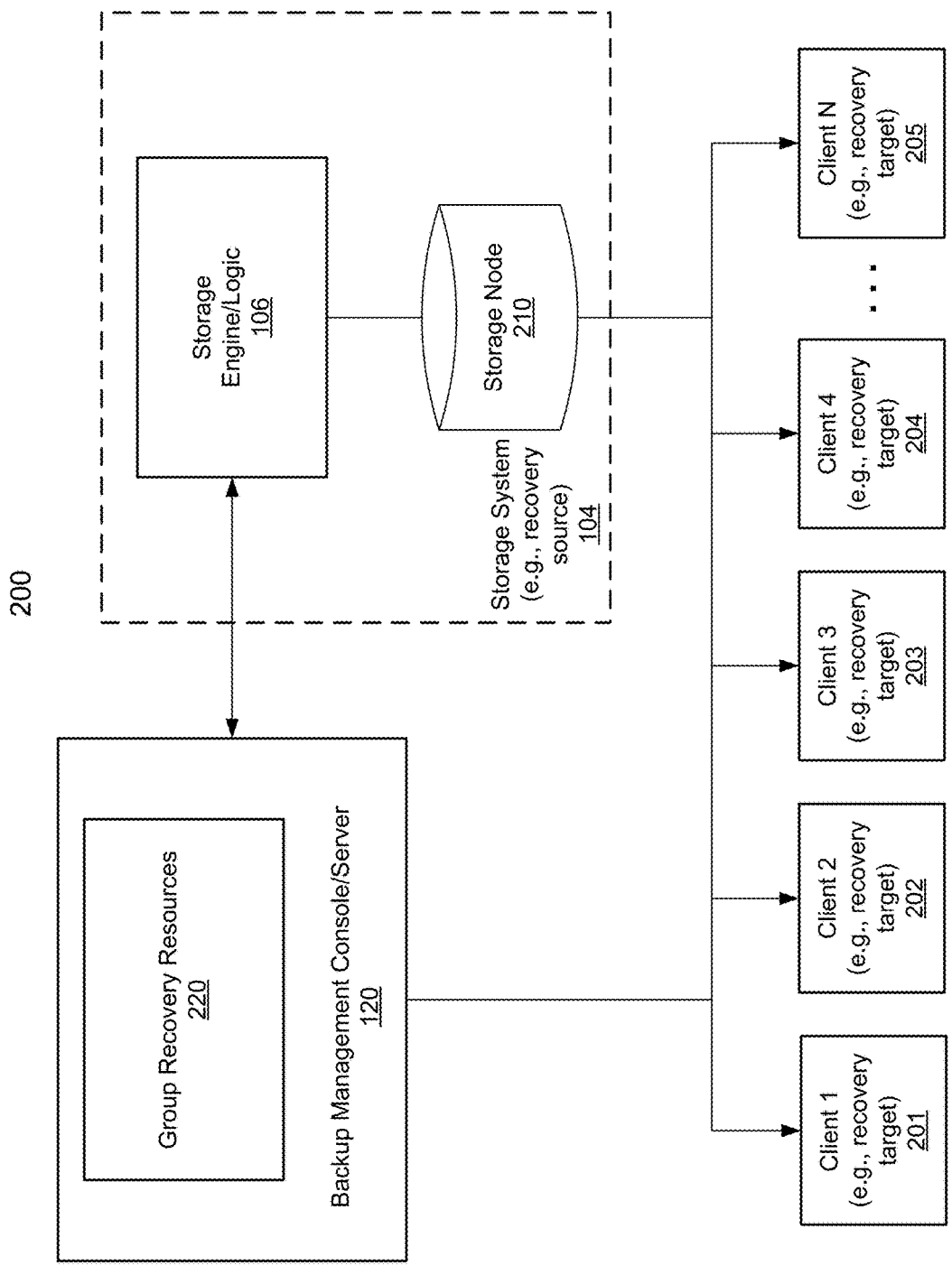
FIG. 2 is a block diagram illustrating a backup system that retrieves data from a set of storage systems for a group recovery according to one embodiment of the invention.

FIG. 2 is a block diagram illustrating a backup system that retrieves data from a set of storage systems for a group recovery according to one embodiment of the invention. The embodiment of FIG. 2 illustrates system 200 that includes, but is not limited to, one or more clients 201-205 communicatively coupled to storage system 104 and backup management server 120. In FIG. 2, clients 201-205, which may represent clients 101-102 of FIG. 1, are each coupled to backup management server 120 and storage system 104, for example, over a network.

According to some embodiments, backup management server 120 includes, but is not limited to, group recovery resources 220. In some embodiments, backup management server 120 receives requests (e.g., a request for a group recovery) and information from clients 201-205, identifies/configures group recovery resources 220 based on the requests and information, and then initiates one or more recovery sessions to recover one or more selected data items from storage system 104 (e.g., recovery source) to each client (e.g., recovery target). Embodiments of the backup management server 120 are described in more detail in reference to FIG. 3. Also, embodiments of the group recovery resources 220 are described in further detail in FIGS. 4A-4B.

In one embodiment, backup management server 120 receives a request for a group recovery for one or more clients (e.g., clients 201-205). The request may be received from an administrator (also referred to as a backup administrator) via a user interface. In response to receiving the request for the group recovery, backup management server 120 identifies a group recovery resource based on the request from group recovery resources 220. Further, each group recovery resource includes one or more recovery item lists (described in further detail below). In some embodiments, each of the recovery item lists corresponds to one of the target recovery storage systems (e.g., clients 201-205). In some embodiments, backup management server 120 traverses the one or more recovery item lists of the group recovery resource to determine a source recovery storage system (e.g., storage system 104), target recovery storage systems, and one or more data items to be selected/recovered to each of the target recovery storage systems.

In one embodiment, backup management server 120 then initiates a set of recovery sessions to recover one or more data items from the source recovery storage systems to the recovery target storage systems substantially concurrently. For example, upon identifying and configuring the group recovery resource, the backup management server 120 initiates one or more recovery sessions to recover the one or more selected data items from storage system 104 to clients 201-205 substantially at the same time. According to one embodiment, in response to initiating the recovery sessions, backup management server 120 transmits a recovery command to the source recover storage system, and the command specifies that the recovery sessions are to be performed at a specific starting time. In some embodiments, in response to initiating the recovery sessions, the backup management server 120 receives a status report (e.g., detailed recovery log 852 of FIG. 8F) from each of the recovery target storage systems that describes a status and an operating system of a corresponding recovery session. According to this embodiment, the backup management server 120 then stores the status report in a persistent storage device.

In one embodiment, storage system 104 includes, but is not limited to, storage service engine 106 and storage node 210 communicatively coupled to each other. Storage service engine 106 may represent any storage service related components configured or adapted to provide storage services (e.g., storage as a service) to a variety of clients using any of the access protocols set forth above. In some embodiments, the storage node 210 may store one or more data items and be accessible to the one or more recovery target systems (e.g., clients 201-205) to recover the stored data items.

Figure 3:
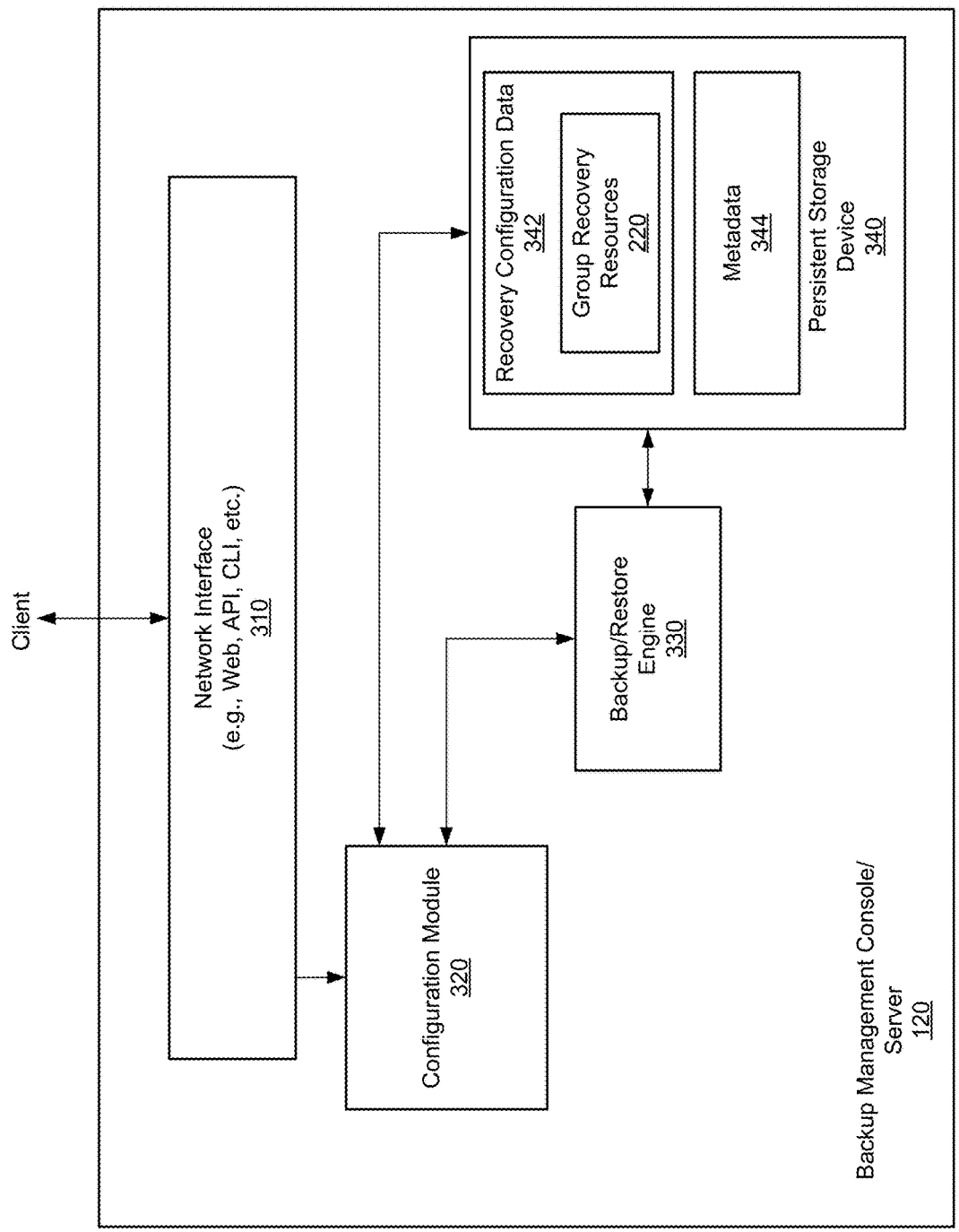
FIG. 3 is a block diagram illustrating a backup management server according to one embodiment of the invention.

FIG. 3 is a block diagram illustrating a backup management server according to one embodiment of the invention.

FIG. 3 shall be described with reference to the example illustrated in FIG. 2. In one embodiment, backup management server 120 includes, but is not limited to, network interface 310 communicatively coupled to configuration module 320, backup/restore engine 330, and persistent storage device 340.

Referring now to FIG. 3, backup management server 120 includes network interface 310 configured to receive one or more data recovery requests from one or more clients using the Remote Procedure Call (RPC), Hypertext Transfer Protocol Source (HTTPS), Representational State Transfer (REST) protocol, or any combination thereof. Network interface 310 can be a wired interface (such as a bus or port), a wireless interface, or a combination of the two. The network interface 310 is configured at least to connect to a network (e.g., network 103).

In one embodiment, a data recovery request includes, but is not limited to, a configuration request, a group recovery request, or any backup/recovery request. Here, a configuration request refers to a request to configure a group recovery resource based on a request for a group recovery for one or more clients. Here, a group recovery request refers to a request to identify a group recovery resource, which includes one or more recovery item lists, to initialize the group recovery resource, and to transmit the corresponding recovery item lists to the requesting client.

According to one embodiment, network interface 310 processes a data recovery request and forwards the request to configuration module 320 after removing at least some of the networking stack related information from the request. For example, configurations module 320 receives the request from one or more clients to configure a group recovery. Configuration module 320 then creates a group recovery resource based on the request, which is stored in group recovery resources 220 and includes one or more recovery item lists for each requesting client.

When a request to restore is received, backup/restore engine 330 processes the data recovery request and, based on the configured group recovery resource, initiates one or more recovery sessions to backup and recover the one or more selected data items from the source storage systems to the recovery target storage systems. In one embodiment, backup/restore engine 330 sends restore commands to a recovery source (e.g., storage system 104 of FIG. 2) to instruct the recovery source to restore data to the recovery targets (e.g., clients 201-205 of FIG. 2) based on the group recovery resource. In response, the recovery source transmits the data to the recovery targets via multiple restore sessions substantially concurrently.

According to one embodiment, backup management server 120 includes a persistent storage device 340. Persistent storage device 340 includes recovery configuration data 342 and metadata 344. Persistent storage device 340 may be, for example, any type of non-volatile storage devices (e.g., hard disks) suitable for storing large volumes of data. The persistent storage device 340 may be maintained in a singular storage device or distributed over an array of such devices. In one embodiment, persistent storage device includes metadata, such as metadata 344, which may be stored in at least some of storage units of persistent storage device 340. Metadata 344 includes information describing the backup data stored in the storage systems managed by the backup management server 120.

In one embodiment, recovery configuration data 342 includes one or more group recovery resources. In one embodiment, each group recovery resource is implemented as a persistent entry of recovery configuration data 342, where each persistent entry is stored in persistent storage device 340 that is accessible by configuration module 320 and/or backup/restore engine 330. In one such embodiment, group recovery resources 220 may be implemented as a data structure, which is stored in persistent storage device 340. For example, group recovery resources 220 may include multiple group recovery resources, where each group recovery resource contains client IDs, recovery data item IDs, source IDs, destination/target IDs, and available recovery types (as illustrated in FIG. 4B).

Note that some or all of the components shown as part of backup management server 120 in FIG. 3 may be implemented in software, hardware, or a combination thereof. For example, some or all of the shown components may be implements in a form of executable instructions that can be stored in a machine-readable storage medium, which when executed, loads the components into an operation system of backup management server 120. Some or all of the components in FIG. 3 may also be stored as part of a persistent storage device. For example, group recovery resources 220 may be stored as part of a persistent storage device, and loaded into memory during operation.

Figure 4A:
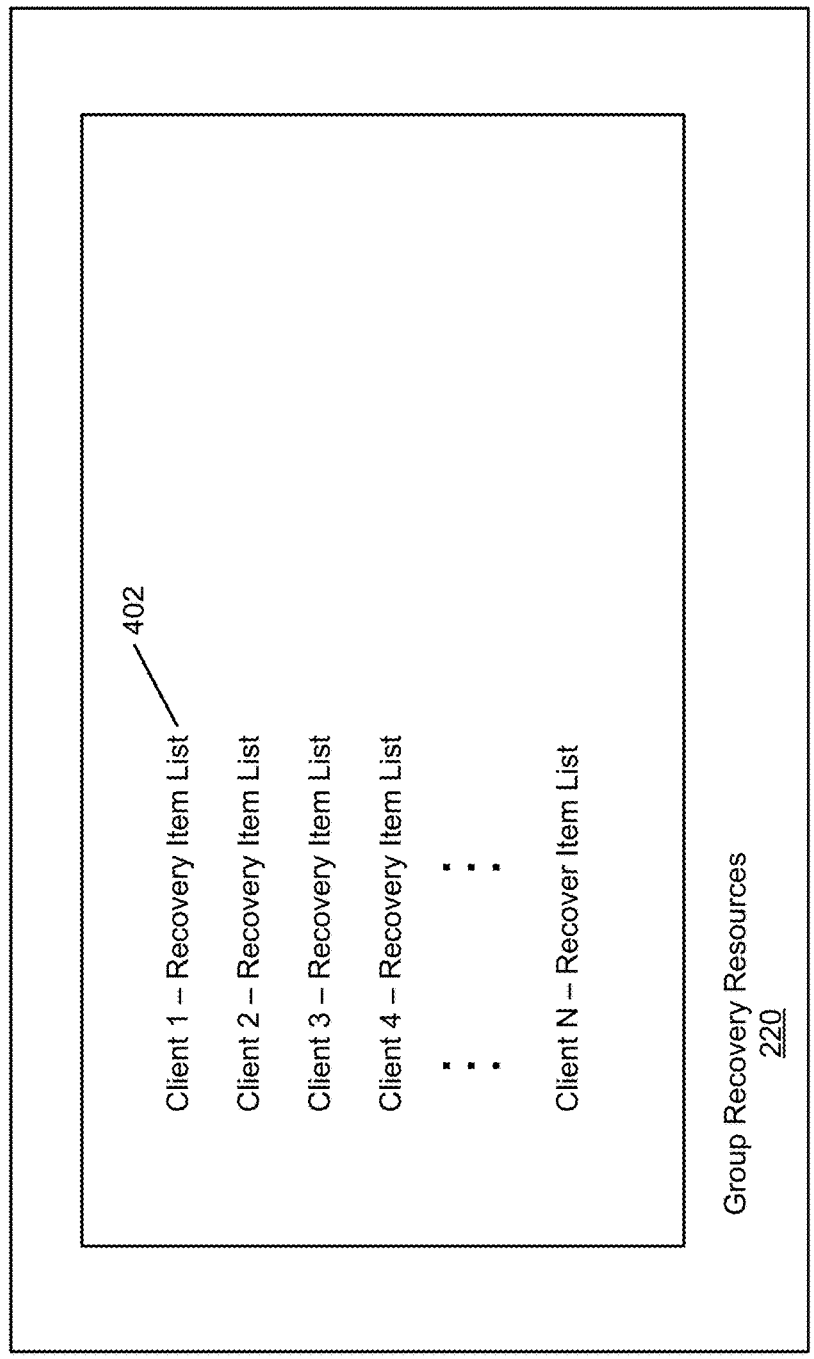
FIGS. 4A and 4B are block diagrams illustrating examples of group recovery resources according to one embodiment of the invention.
Figure 4B:
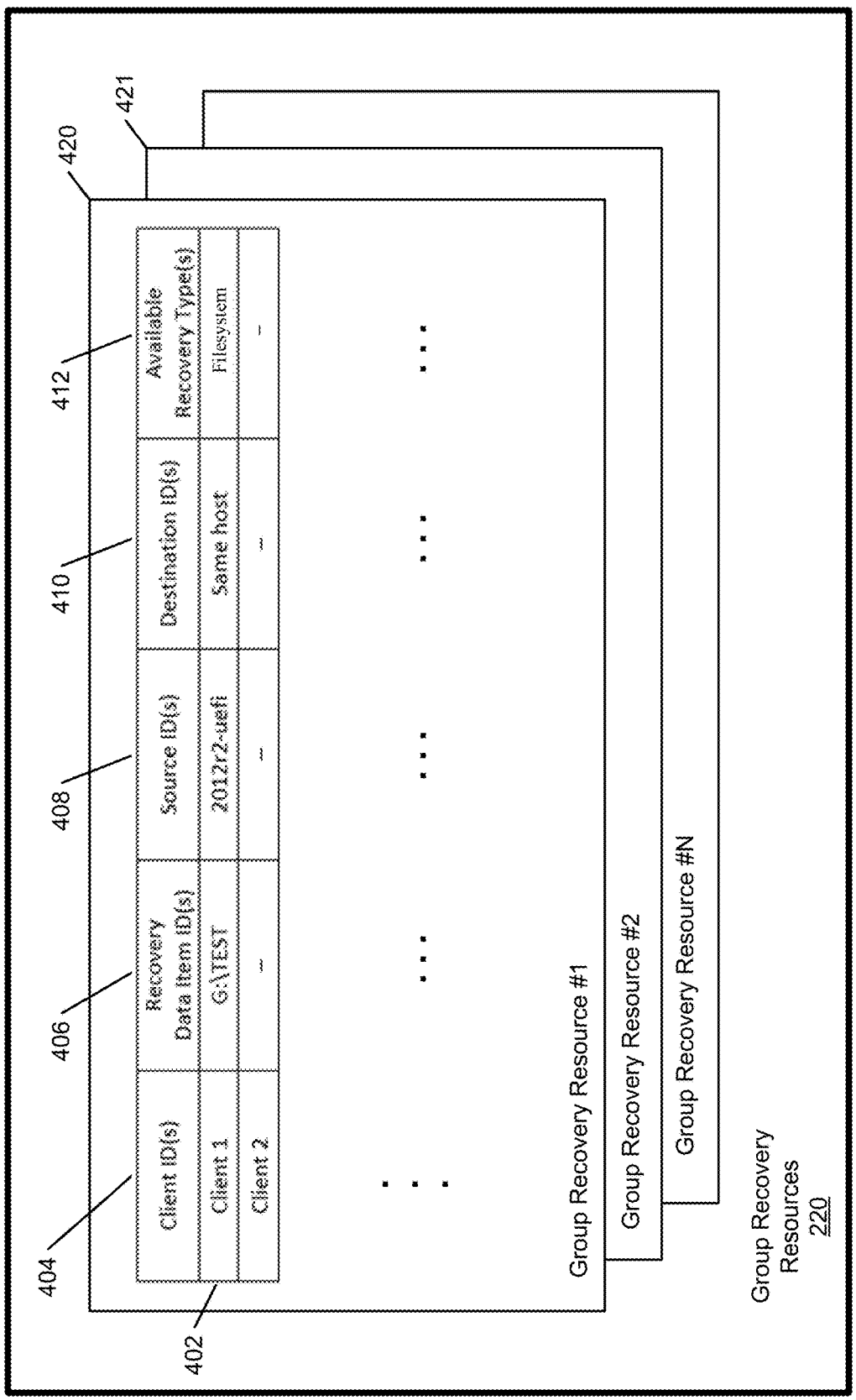

FIGS. 4A and 4B are block diagrams illustrating examples of group recovery resources according to one embodiment of the invention. In this example as shown in FIG. 4A, group recovery resources 220 includes one or more clients (e.g., recovery targets) associated with one or more recovery item lists, respectively. This illustrated block diagram is a list, but another block diagram may work equally well, such as a table, a map, and a rational database. The list contains one or more clients, and each client is associated with a recovery item list 402, which includes one or more data items (not shown). According to some embodiments, group recovery resources 220 is maintained and configured by a backup administrator. For example, the backup administrator initiates a request for a group recovery and identifies a group recovery resource, in which the group recovery resource can accommodate multiple clients and recover multiple data items substantially at the same time. In some embodiments, group recovery resources 220 allows the backup administrator to recover and edit one or more data items collectively if the clients of the respective group recovery resource share common files, folders, or volumes.

Group recovery resources 220 may be implemented in a storage system such as backup management server 120 or any component which may perform/manage data recovery. It should be understood that a client may be associated with multiple recovery item lists and group recovery resources. Of course, the block diagram for illustrating an example of a group recovery resource may include additional and/or different parameters.

Referring now to FIG. 4B. In one embodiment, group recovery resources 220 includes, but is not limited to, one or more group recovery resources 420-421. Each group recovery resource is associated with a table that illustrates client IDs 404, recovery data item IDs 406, source IDs 408, destination IDs 410 (also referred to as target IDs), and available recovery types 412. The illustrated block diagram is a table, but another block diagram may work equally well, such as a list, a map, and a rational database. FIG. 4B shall be described with reference to the example illustrated in FIG. 2. Certain details, however, have been omitted in FIG. 4B in order to avoid obscuring the invention. Further, certain details have been added in FIG. 4B in order to better illustrate the present invention.

In this example as shown in FIG. 4B, group recovery resource 220 includes one or more group recovery resources 420-421, and each recovery resource provides a list of clients (e.g., Client 1, Client 2), in which each client is associated with a recovery item list (e.g., recovery item list 402). In one embodiment, group recovery resource 420 is configured to execute multiple recovery items lists for multiple clients in order to recover multiple selected recovery data items for each client. Further, at group recovery resource 420, the table contains a list of detailed recovery item lists, and each recovery item list specifies a client, one or more recovery data items, a source storage system, a target storage system, and one or more available recovery types supported by either system. In some embodiments, in response to receiving a request for data recovery from a client, a backup administrator configures a recovery item list for the client based on the request, which includes selecting/identifying a client ID, one or more recovery data item IDs, a source ID, a destination ID, and one or more available recovery types. For example, the backup administrator configures recovery item list 402 for Client 1, specifies that Client 1 will recover the data items in the G:\TEST folder, and recovers the G:\TEST folder from the source host (e.g., 2012r2-uefi) to the selected recovery/destination host (e.g., 2012r2-uefi), which in this example the same host was selected for the data recovery.

FIG. 5 is a flow diagram illustrating a method for data recovery from a storage system according to one embodiment of the invention. For example, method 500 can be performed by backup management server 120. Method 500 can be implemented in software, firmware, hardware, or any combination thereof. Referring now to FIG. 5, at block 505, in response to receiving a request for a group recovery, a backup management server 120 identifies a group recovery resource based on the request, where the group recovery resource includes one or more recovery item lists. For example, backup management server 120 identifies a group recovery resource, which includes one or more recovery item lists, based on a request for a group recovery (e.g., a single request).

At block 510, a backup management server traverses the one or more recovery item lists of the group recovery resource to determine a source recovery storage system, target recovery storage systems, and one or more data items to be recovered to each of the target recovery storage systems. For example, backup management server 120 traverses a client's recovery item list from a group recovery resource to determine a source recovery storage system (e.g., storage system 104), target recovery storage systems (e.g., clients 201-205), and one or more data items (e.g., recovery data item IDs 406) to be recovered to each of the target recovery storage systems. At block 515, a backup management server initiates one or more recovery sessions to recover the one or more data items from the source recovery storage systems to the recovery target storage systems substantially concurrently. For example, backup management server 120 initiates one or more recovery sessions for one or more clients (e.g., clients 101-102) to recover multiple data items from the source recovery storage systems to one or more recovery target storage systems at the same time, which allows multiple clients to recover multiple selected data items simultaneously, in response to a single request to recover the data, for example, from an administrator. In one embodiment, based on the group recovery resource, the recovery logic of the backup management server sends one or more recovery commands to the recovery source system and/or the recovery target systems to instruct them to perform the actual recovery operations by transmitting the previously backed up data from the recovery source system to the recovery target systems.

FIG. 6 is a flow diagram illustrating a method for configuring a group recovery according to one embodiment of the invention. For example, method 600 can be performed by backup management server 120. Method 600 can be implemented in software, firmware, hardware, or any combination thereof. Referring now to FIG. 6, at block 605, a backup management server creates a group recovery resource for one or more clients, where the group recovery resource includes information specifying a source recovery system, one or more target recovery systems, and a recovery type (e.g., file system, block-based, and snapshot recovery). For example, backup management server 120 creates a group recovery resource (e.g., group recovery resource 420 of FIG. 4B) for one or more clients (e.g., clients 101-102), which includes selecting a source recovery system, one or more target recovery systems, and a recovery type, and then queries the source recovery system and the target recovery system to determine the recovery types that are supported by either recovery system. For example, note that the software that supports the selected recovery type must be installed on the target recovery system. In one embodiment, each of the storage systems periodically sends its configuration information to the backup management server including the data stored therein and the recovery type.

At block 610, a backup management server selects a set of one or more recovery parameters for the group recovery resource, where the set of one or more recovery parameters includes information specifying one or more recovery data items, a recovery file path (e.g., an original path, a new destination path), one or more duplicate options (e.g., rename, ignore, overwrite, etc.), and a backup volume. For example, backup management server 120 selects a set of recovery options to configure the group recovery resource for the one or more clients. At block 615, a backup management server generates the group recovery resource for the one or more clients at a specified time (e.g., an instant recovery time, a scheduled recovery time, and a specified hard stop time), where the group recovery resource includes one or more recovery item lists and a summary configuration report.

At block 620, a backup management server receives a recovery result log of the group recovery operations from the associated source and/or target systems, where the recovery result log includes information specifying a recovery duration, a recovery status (e.g., succeeded, cancelled), a status of the recovering item lists, and a completed backup volume. At block 625, a backup management server stores the recovery result log in a persistent storage device. For example, backup management server 120 receives a recovery result log of the group recovery operations, which allows an administrator to determine whether there was a successful recovery.

Figure 7:
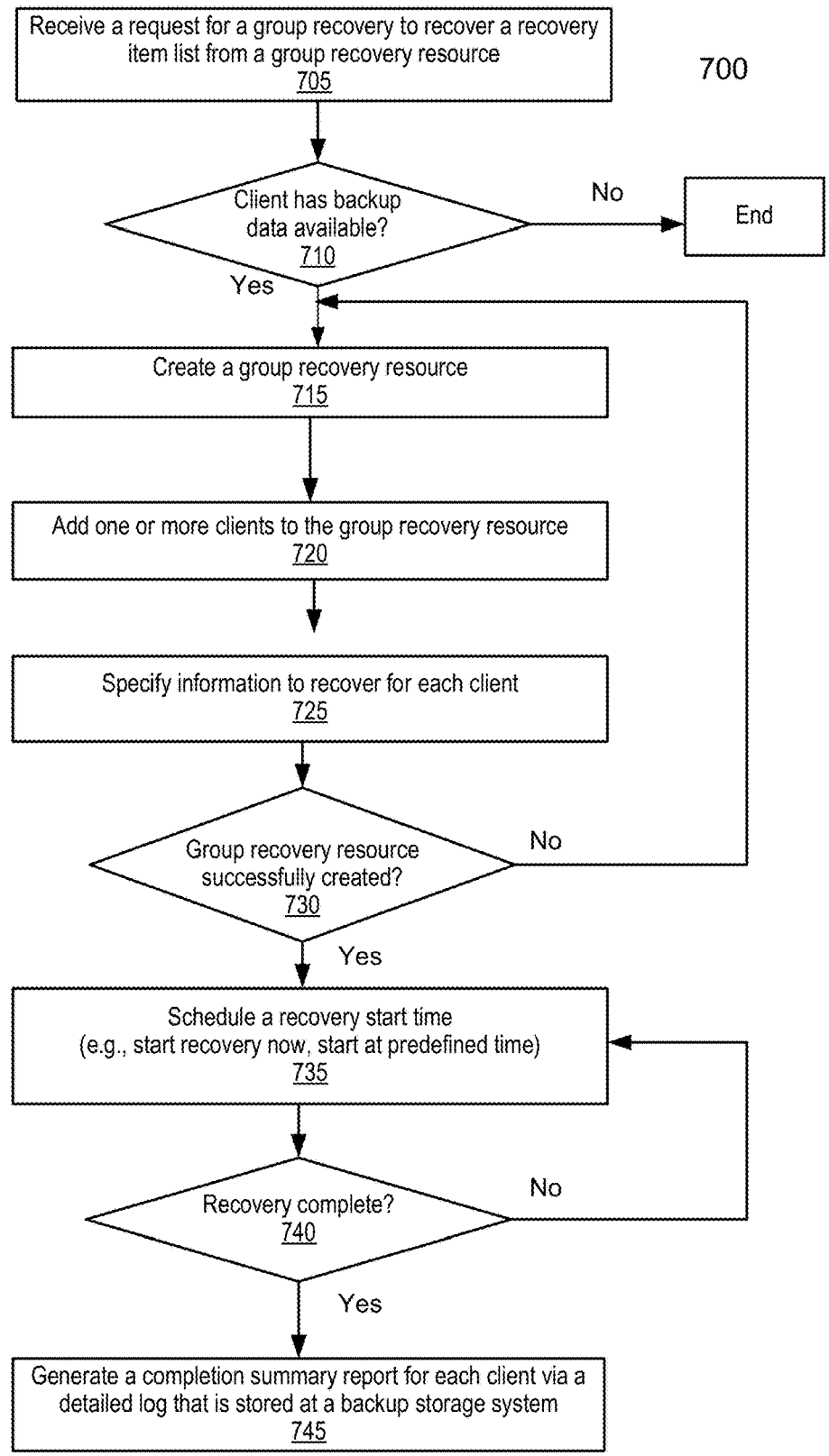
FIG. 7 is a flowchart illustrating a method for data recovery from a storage system according to one embodiment of the invention.

FIG. 7 is a flowchart illustrating a method for data recovery from a storage system according to one embodiment of the invention. For example, method 700 can be performed by backup management server 120, which may be initiated by an administrator (e.g., a backup system administrator) that utilizes the backup management server. Method 700 can be performed by processing logic which may be implemented in software, firmware, hardware, or any combination thereof. Referring now to FIG. 7, at block 705, a backup management server receives a request for a group recovery from a client to recover a recovery item list specified in a group recovery resource. For example, backup management server 120 receives a request for a group recovery from an administrator to recover a recovery item list (e.g., recovery item list 402 of FIG. 4B) of a group recovery resource to recover one or more data items from a recovery source to one or more recovery targets, such as a client. At block 710, processing logic determines whether the client has backup data that is available for the group recovery. For example, an administrator determines that the client has backup data that is available for the group recovery from one or more storage systems. If not, the processing logic ends the backup and recovery operation.

At block 715, an administrator creates a group recovery resource. For example, in response to receiving the request for the group recovery, the administrator accesses backup management server 120 to create a group recovery resource based on the request, where the group recovery resource can include one or more recovery item lists. At block 720, the administrator adds one or more clients to the group recovery resource. For example, the administrator may add the one or more clients to the group recovery resource based on, but is not limited to, a client's request, a client having available backup data, a scheduled backup operation, and/or a maintenance operation. At block 725, the administrator specifies information for each recovery item list, which includes information specifying a source recovery storage system, target recovery storage systems, and one or more data items to be recovered to each of the target recovery storage systems. For example, the administrator can select/edit the one or more clients collectively if the one or more clients have common files, folders, and/or volumes to recover. Also note that the target recovery storage system can be different from the source recovery storage system, or the target recovery storage system is the same as the source recovery storage system.

At block 730, the group recovery resource, which includes the one or more recovery item lists, is successfully created after selecting the recovery options for each client (or collectively selecting the recovery options for the one or more clients if they share common files/folders/volumes). At block 735, the administrator schedules a recovery start time for the group recovery resource. For example, the administrator or backup management server 120 schedules the recovery start time (e.g., recovery start time 844 of FIG. 8E) of the group recovery resource to initiate instantaneously or at a specified start time. At block 740, in response to initiating the group recovery resource, the administrator determines whether the group recovery resource has been completed. For example, backup management server 120 initiates one or more recovery sessions to recover the one or more data items from the source recovery storage systems to the recovery target storage systems substantially concurrently in order to complete the group recovery resource. At block 745, a completion summary report is generated for each client via a detailed log that is received from a backup storage system. For example, backup management server 120 receives a status report (e.g., a completion summary report) from each of the recovery target storage systems describing a corresponding recovery session, and then stores the status report in a persistent storage device of the server (e.g., persistent storage device 340).

Figure 8A:
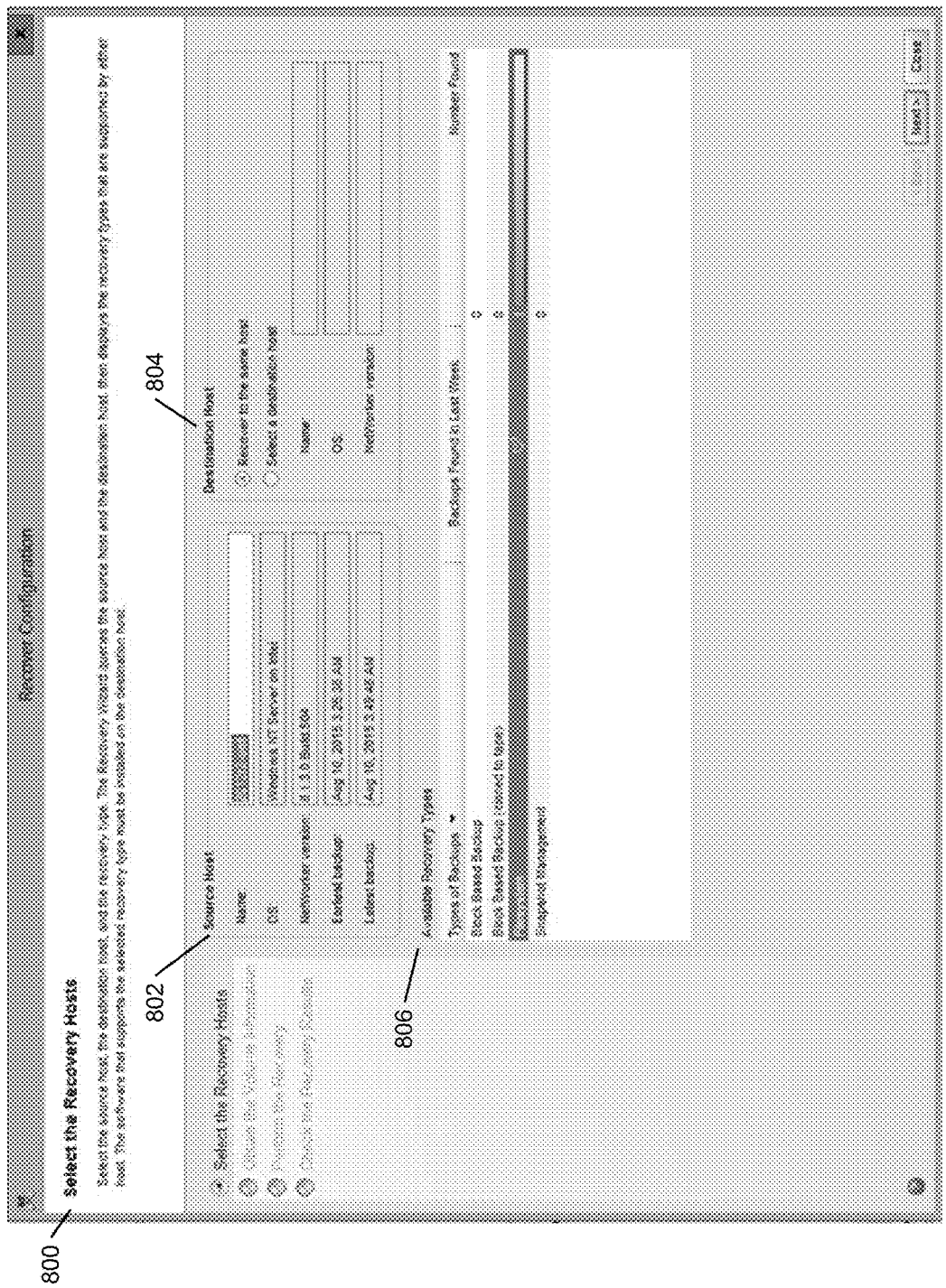
FIGS. 8A-8F are screen shots illustrating a user interface for data recovery according to one embodiment of the invention.

FIGS. 8A-8F are screen shots showing a graphical user interface (GUI) to create and perform a data recovery configuration according to one embodiment of the invention. For example, the user interfaces of FIGS. 8A-8F can be utilized by an administrator (e.g., a backup system administrator) of backup management server 120, which may represent network interface 3210 of FIG. 3. FIG. 8A shows an example of a user interface 800 that is used to select data recovery hosts, which includes selecting a source host 802 (e.g., a source recovery storage system), a destination host 804 (e.g., a target recovery storage system), and a type of recovery 806. For example, at user interface 800, an administrator selects source host 802 destination host 804, and recovery type 806, which includes a file system recovery, a block-based recovery, and a snapshot-based recovery. User interface 800 provides that the destination host 804 either recovers to the same host (i.e., the source host) or a selected destination host. In one embodiment, backup management server 120 queries source host 802 and destination host 804, and then displays the one or more recovery types 806 that are supported by either host. Note that the software supported by the selected recovery type needs to be installed on the destination host.

Figure 8B:
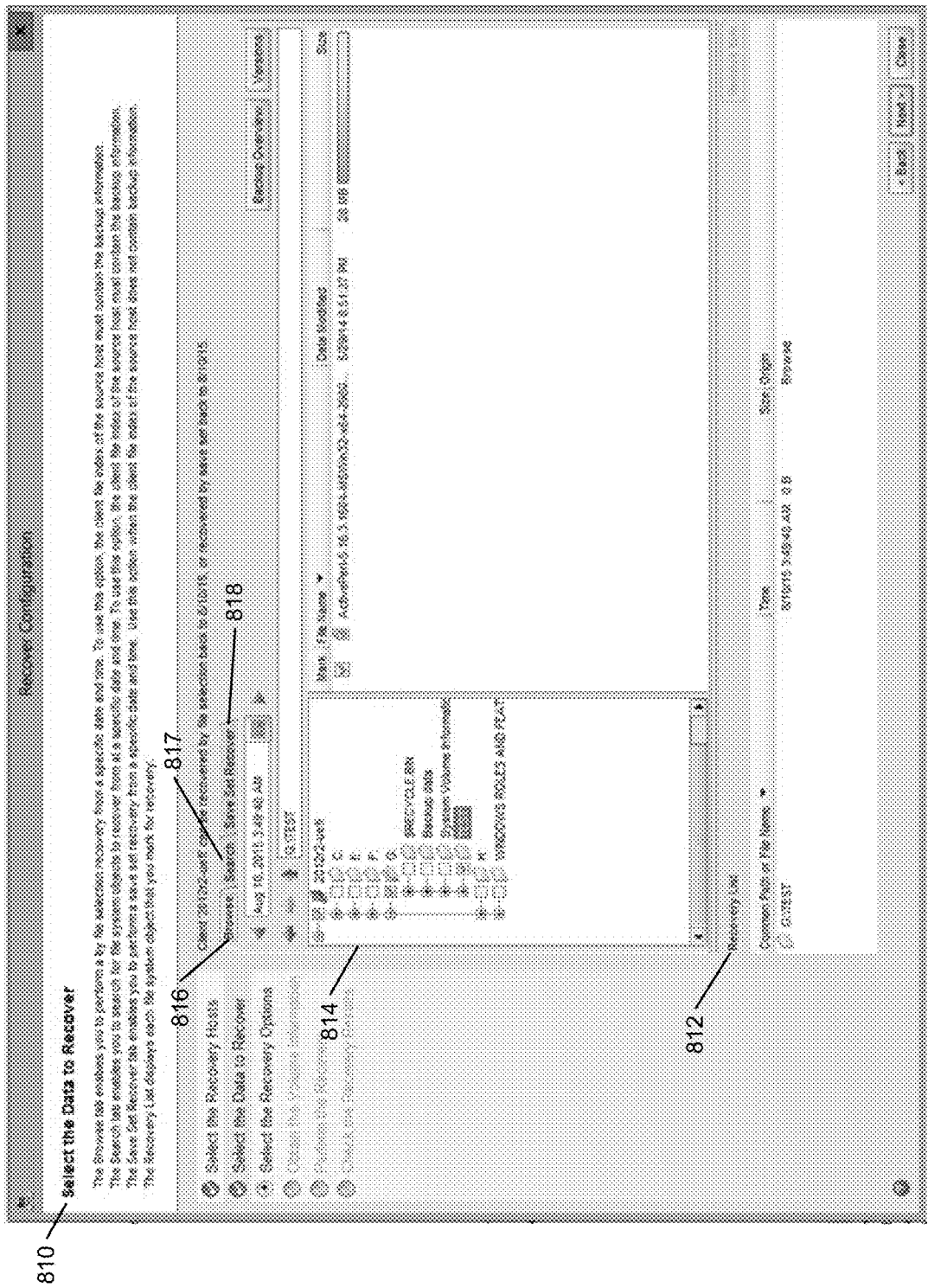

FIG. 8B shows an example of a user interface 810 that is used to select one or more data items 814 to be recovered to a recovery list 812 (e.g., GATEST) of the group recovery resource, which can include multiple recovery item lists. The GUI as shown in FIG. 8B may be presented in response to a selection of "select the recovery hosts" from FIG. 8A. For example, at user interface 810 the administrator selects the one or more data items using a browse tab 816, a search tab 817, and/or a save set recover tab 818. The browse tab 816 enables the administrator to perform a file-by-file selection recovery from a specific date and time. The search tab 817 enables the administrator to search for the file system recovery objects from a specific date and time. Note that the browse tab 816 and search tab 817 are used when the client file index of the source host contains the backup information. Furthermore, the save set recover tab 818, which is used when the client file index of the source host does not contain the backup information, enables the administrator to perform a save set recovery from a specific date and time.

Figure 8C:
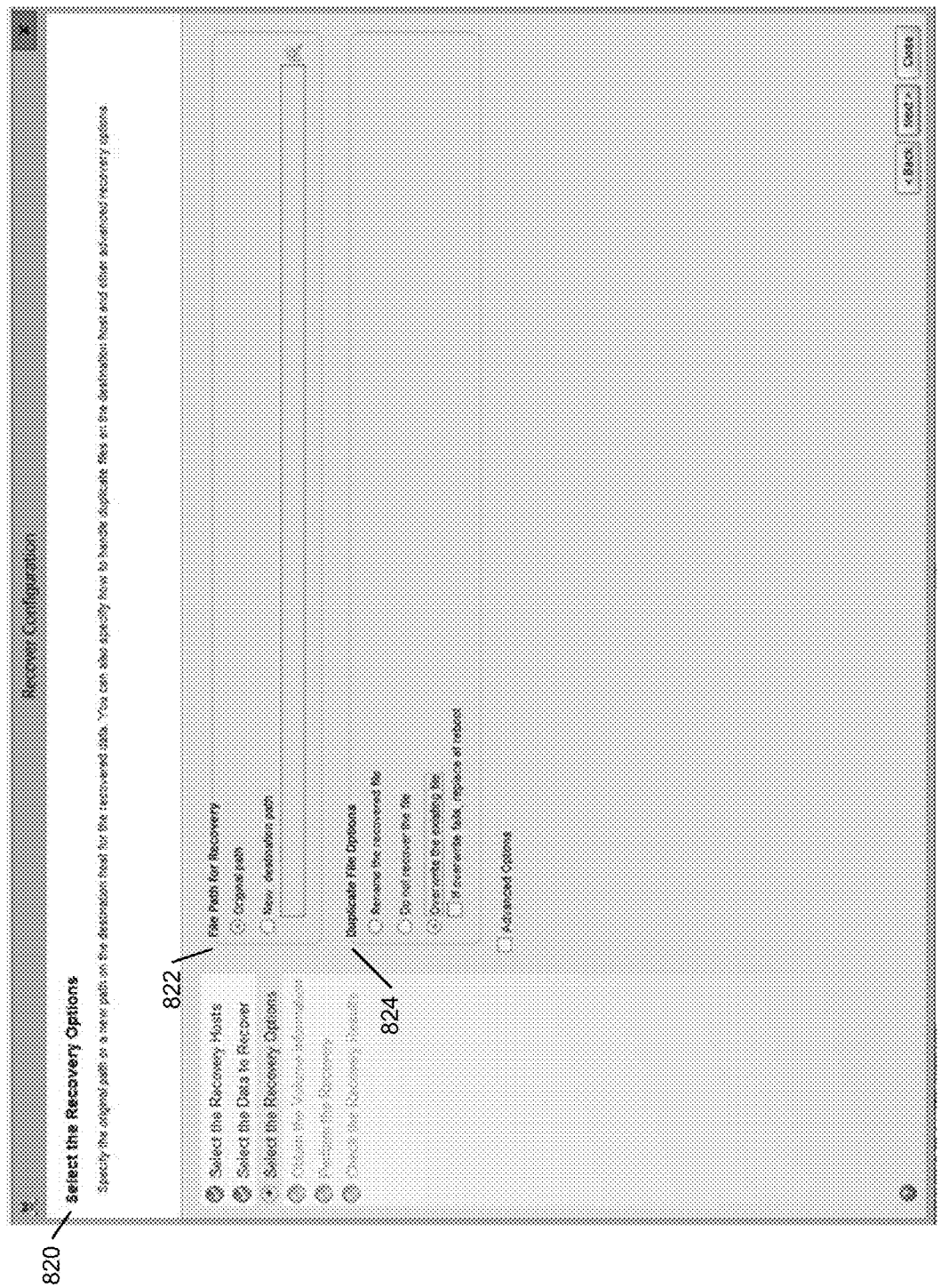

FIG. 8C shows an example of a user interface 820 that is used to select data recovery options, which includes selecting a file path 822 and duplicating file options 824. The GUI as shown in FIG. 8C may be presented in response to a selection of "select the data to recover" from FIG. 8B. For example, at user interface 820, the administrator specifies the file path 822 by selecting an original path or a new destination path for the recovered data items. The administrator also specifies the duplicating file options 824 (i.e., how to handle duplicate files on the destination host) by selecting to rename the recovered files, not recover the files, or overwrite the existing files.

Figure 8D:
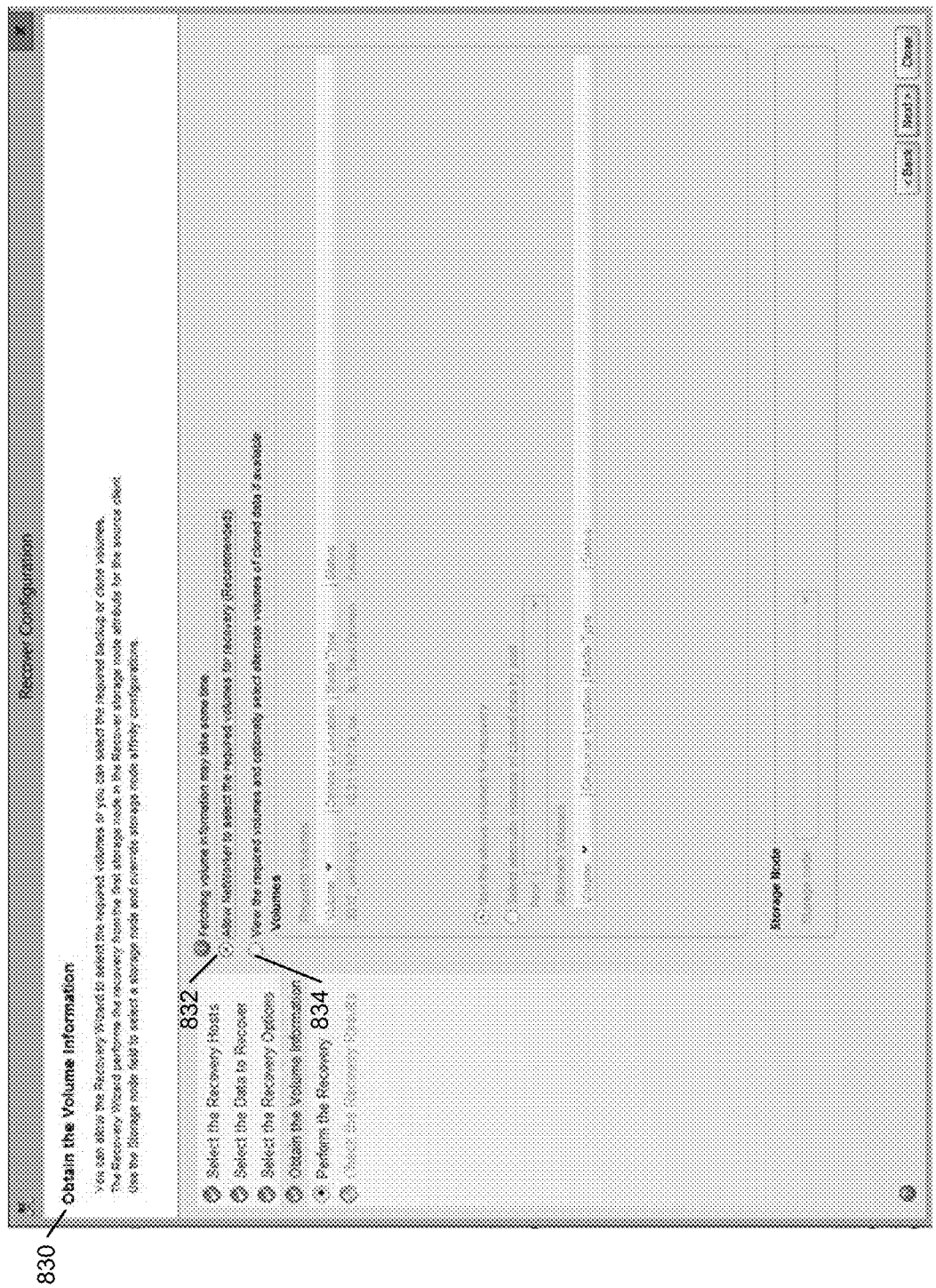

FIG. 8D shows an example of a user interface 830 that is used to obtain the backup volume information, which includes selecting a recommended/required volume 832 or an optionally alternative volume 834. The GUI as shown in FIG. 8D may be presented in response to a selection of "select the recovery options" from FIG. 8C. For example, at user interface 830, the administrator can allow a recovery wizard of the recovery configuration to select the required volumes (i.e., "Allow the recovery configuration to select the required volumes for recovery (Recommended)), or the administrator can select the required backup or clone volumes (i.e., "View the required volumes and optionally select alternate volumes of cloned data if available).

Figure 8E:
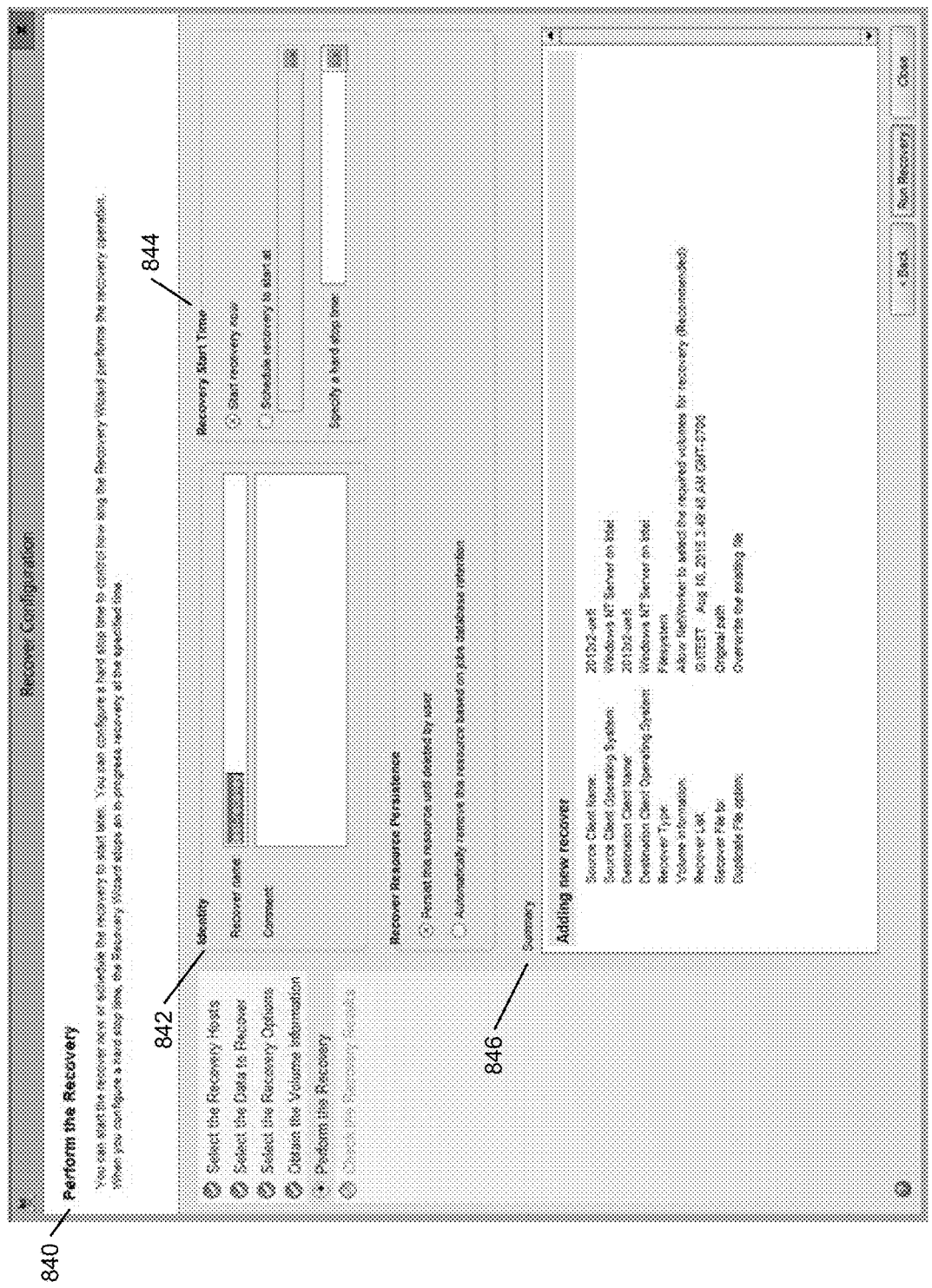
Figure 8F:
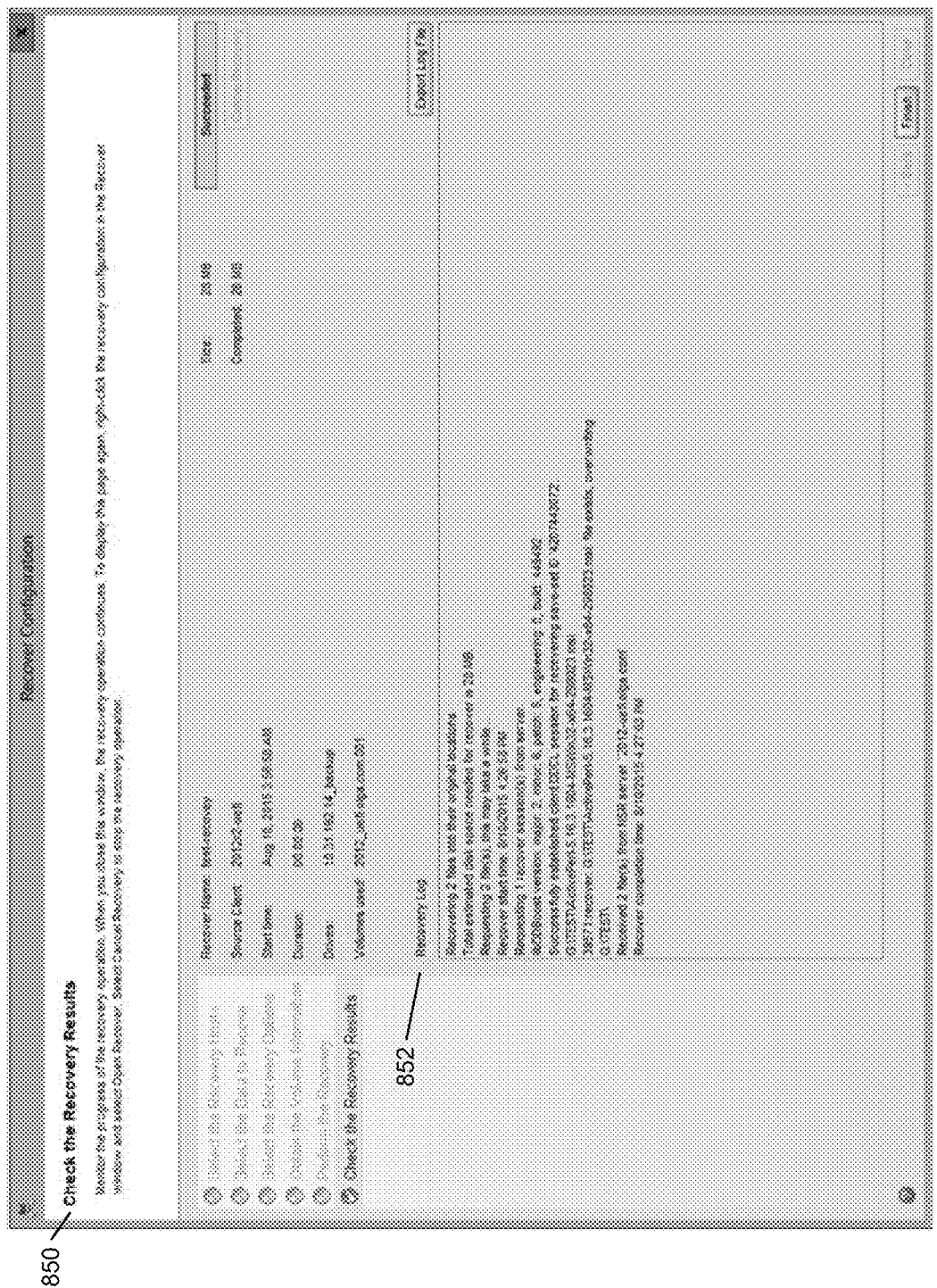

FIG. 8E shows an example of a user interface 840 that is used to configure data recovery, which includes a group recovery resource name 840, a recovery start time 844, and a summary report 846 of the group recovery resource. The GUI as shown in FIG. 8E may be presented in response to a selection of "obtain the volume information" from FIG. 8D. For example, at user interface 840, the administrator can start the data recovery immediately or schedule the data recovery to start at a pre-defined time. The administrator can also configure a hard stop time to control how long the recovery wizard performs the data recovery operation. For example, when you configure the hard stop time, the recovery wizard terminates an in-progress data recovery at the pre-defined/specified time. Furthermore, the administrator can select how long to maintain/persist the group recovery resource by selecting to persist the resource until the client deletes the resource or automatically remove the resource based on the jobs database retention. FIG. 8F shows an example of a user interface 850 that is used to check the data recovery results, which includes a detailed recovery log 852. The GUI as shown in FIG. 8F may be presented in response to a selection of "perform the recovery" from FIG. 8E. For example, in response to initiating the group recovery resource, the administrator is allowed to monitor the progress of the data recovery operation and has the option to cancel the data recovery. It should also be understood that FIGS. 8A-8F are an illustration of examples of user interfaces, but the user interfaces may include additional and/or different parameters.

Figure 9:
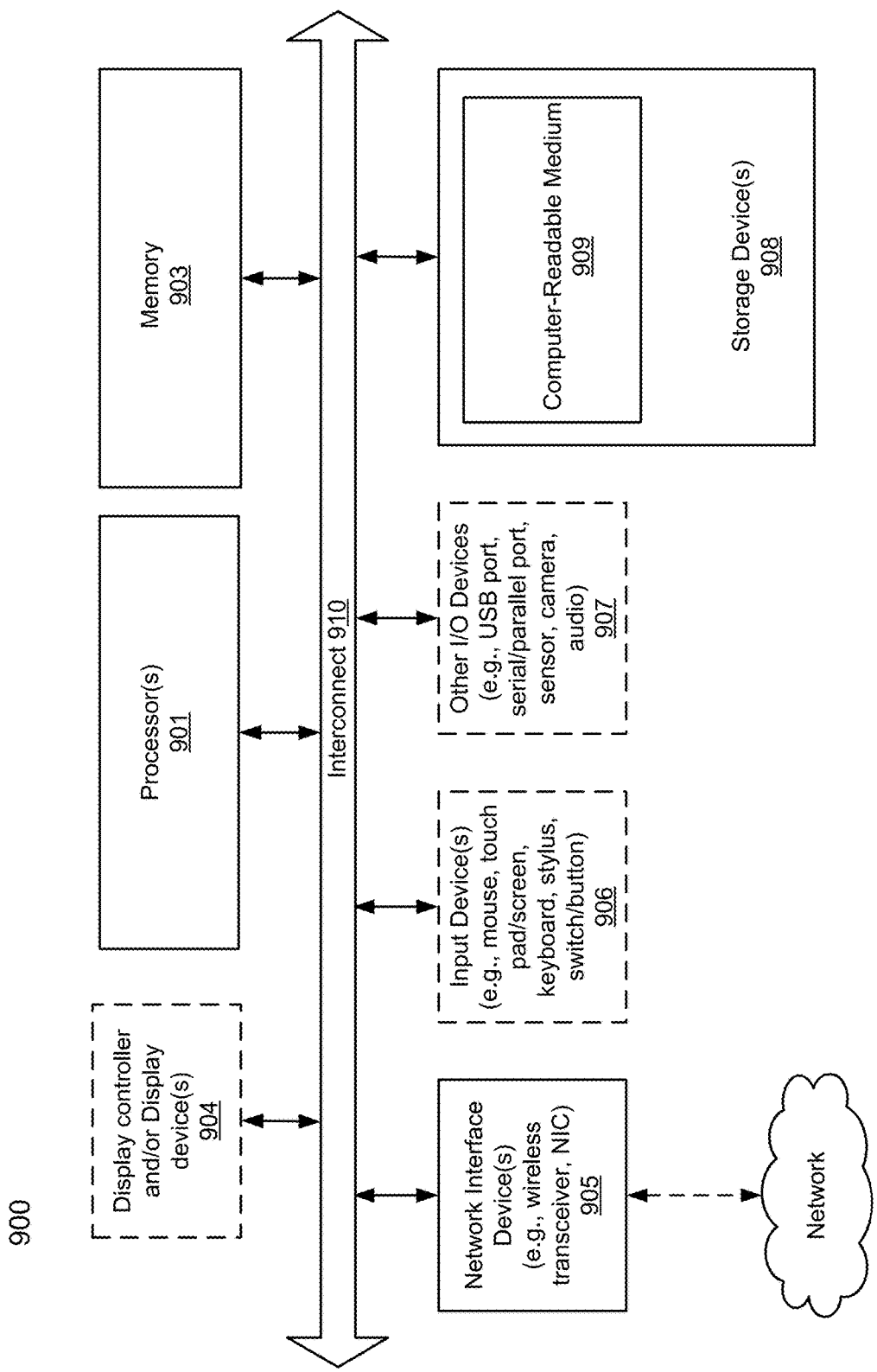
FIG. 9 is a block diagram illustrating a data processing system according to one embodiment.

FIG. 9 is a block diagram illustrating a data processing system according to one embodiment which may be used with one embodiment of the invention. For example, system 900 may represents any of data processing systems described above performing any of the processes or methods described above. System 900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 900 is intended to show a high level view of many components of the computer system. However, it is to be understood that additional components may be present in certain implementations and furthermore, different arrangement of the components shown may occur in other implementations. System 900 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 900 includes processor 901, memory 903, and devices 904-908 via a bus or an interconnect 910. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 901, which may be a low power multi-core processor socket such as an ultra-low voltage processor, may act as a main processing unit and central hub for communication with the various components of the system. Such processor can be implemented as a system on chip (SoC). Processor 901 is configured to execute instructions for performing the operations and steps discussed herein. System 900 may further include a graphics interface that communicates with optional graphics subsystem 904, which may include a display controller, a graphics processor, and/or a display device.

Processor 901 may communicate with memory 903, which in one embodiment can be implemented via multiple memory devices to provide for a given amount of system memory. Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 900 may further include IO devices such as devices 904-908, including display device(s) 904, network interface device(s) 905, optional input device(s) 906, and other optional IO device(s) 907, and storage device(s) 908. Network interface device 905 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of one or more touch sensitivity technologies, including but not limited to capacitive, resistive, infrared, and surface acoustic wave technologies, as well as other proximity sensor arrays or other elements for determining one or more points of contact with the touch screen.

IO devices 907 may include an audio device. An audio device may include a speaker and/or a microphone to facilitate voice-enabled functions, such as voice recognition, voice replication, digital recording, and/or telephony functions. Other IO devices 907 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 907 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 910 via a sensor hub (not shown), while other devices such as a keyboard or thermal sensor may be controlled by an embedded controller (not shown), dependent upon the specific configuration or design of system 900.

To provide for persistent storage of information such as data, applications, one or more operating systems and so forth, a mass storage (not shown) may also couple to processor 901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 901, e.g., via a serial peripheral interface (SPI). This flash device may provide for non-volatile storage of system software, including a basic input/output software (BIOS) as well as other firmware of the system.

Storage device 908 may include computer-accessible storage medium 909 (also known as a machine-readable storage medium or a computer-readable medium) on which is stored one or more sets of instructions or software embodying any one or more of the methodologies or functions described herein. Computer-readable storage medium 909 may also be used to store the some software functionalities described above persistently. While computer-readable storage medium 909 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Components and other features described herein can be implemented as discrete hardware components or integrated in the functionality of hardware components such as ASICS, FPGAs, DSPs or similar devices. In addition, components and other features described herein can be implemented as firmware or functional circuitry within hardware devices. Further, the components and other features can be implemented in any combination hardware devices and software components.

Note that while system 900 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for data recovery from a storage system, the method comprising:
receiving a group recovery request as a single command for recovering a plurality of recovery items from a plurality of source recovery storage systems for a plurality of clients concurrently;
in response to receiving the group recovery request, identifying by a restore module executed by a processor of a backup management server, a group recovery resource based on the group recovery request, wherein the group recovery resource is previously configured by a configuration module executed by the processor of the backup management server based on a plurality of client requests, wherein the group recovery resource includes a plurality of recovery item lists, wherein the plurality of recovery item lists correspond to recoveries by the plurality of clients over a network, wherein a first of the plurality of recovery item lists corresponds to a recovery of a first one or more data items from a first of the plurality of source recovery storage systems to a first of a plurality of target recovery storage systems associated with a first of the plurality of clients, wherein a second of the plurality of recovery item lists corresponds to a recovery of a second one or more data items from a second of the plurality of source recovery storage systems to a second of the plurality of target recovery storage systems associated with a second of the plurality of clients, and wherein the group recovery resource further includes a duplicate option specifying how to handle duplicate files on a target recovery storage system, the duplicate option being selected from a group consisting of renaming recovered files, not recovering files, and overwriting existing files;
traversing by the restore module executed by the processor of the backup management server, the plurality of recovery item lists of the group recovery resource to determine the first and the second of the plurality of source recovery storage systems, the first and the second of the plurality of target recovery storage systems corresponding to the first and the second of the plurality of clients, respectively, and the first and the second one or more data items to be recovered to the first and the second target recovery storage systems, respectively; and
initiating by the restore module executed by the processor of the backup management server, a plurality of recovery sessions to recover the data items from the first and the second of the plurality of source recovery storage systems to the respective first and the second of the plurality of target recovery storage systems of the plurality of clients concurrently.

2. The method of claim 1, wherein each of the recovery item lists corresponds to one of the plurality of target recovery storage systems.

3. The method of claim 1, wherein each of the recovery item lists further specifies a starting time at which a corresponding recovery session is to be performed.

4. The method of claim 3, wherein initiating a plurality of recovery sessions comprises transmitting a recovery command to the first and the second of the plurality of source recovery storage systems, the command specifying the plurality of recovery sessions to be performed at a specific starting time.

5. The method of claim 1, wherein each of the recovery item lists further includes information specifying a type of recovery, which is one of a file system recovery, a block-based recovery, and a snapshot-based recovery.

6. The method of claim 1, further comprising:
receiving a status report from each of the plurality of recovery target storage systems describing an operating system of a corresponding recovery session; and storing the status report in a persistent storage device of the server.

7. A non-transitory machine-readable medium having instructions stored therein, which when executed by a processor, cause the processor to perform operations for authenticating and authorizing users in a multi-tenant environment, the operations comprising:

receiving a group recovery request as a single command for recovering a plurality of recovery items from a plurality of source recovery storage systems for a plurality of clients concurrently;

in response to receiving the group recovery request, identifying by a restore module executed by a processor of backup management server, a group recovery resource based on the group recovery request, wherein the group recovery resource is previously configured by a configuration module executed by the processor of the backup management server based on a plurality of client requests, wherein the group recovery resource includes a plurality of recovery item lists, wherein the plurality of recovery item lists correspond to recoveries by the plurality of clients over a network, wherein a first of the plurality of recovery item lists corresponds to a recovery of a first one or more data items from a first of the plurality of source recovery storage systems to a first of a plurality of target recovery storage systems associated with a first of the plurality of clients, wherein a second of the plurality of recovery item lists corresponds to a recovery of a second one or more data items from a second of the plurality of source recovery storage systems to a second of the plurality of target recovery storage systems associated with a second of the plurality of clients, and wherein the group recovery resource further includes a duplicate option specifying how to handle duplicate files on a target recovery storage system, the duplicate option being selected from a group consisting of renaming recovered files, not recovering files, and overwriting existing files;

traversing by the restore module executed by the processor of the backup management server, the plurality of recovery item lists of the group recovery resource to determine the first and the second of the plurality of source recovery storage systems, the first and the second of the plurality of target recovery storage systems corresponding to the first and the second of the plurality of clients, respectively, and the first and the second one or more data items to be recovered to the first and the second target recovery storage systems, respectively; and initiating by the restore module executed by the processor of the backup management server, a plurality of recovery sessions to recover the data items from the first and the second of the plurality of source recovery storage systems to the respective first and the second of the plurality of target recovery storage systems of the plurality of clients concurrently.

8. The medium of claim 7, wherein each of the recovery item lists corresponds to one of the plurality of target recovery storage systems.

9. The medium of claim 7, wherein each of the recovery item lists further specifies a starting time at which a corresponding recovery session is to be performed.

10. The medium of claim 9, wherein initiating a plurality of recovery sessions comprises transmitting a recovery command to the first and the second of the plurality of source recovery storage systems, the command specifying the plurality of recovery sessions to be performed at a specific starting time.

11. The medium of claim 7, wherein each of the recovery item lists further includes information specifying a type of recovery, which is one of a file system recovery, a block-based recovery, and a snapshot-based recovery.

12. The medium of claim 7, further comprising:

receiving a status report from each of the plurality of recovery target storage systems describing an operating system of a corresponding recovery session; and storing the status report in a persistent storage device of the server.

13. A system, comprising:

a processor; and a memory coupled to the processor for storing instructions, which when executed from the memory, cause the processor to perform operations, the operations including:

receiving a group recovery request as a single command for recovering a plurality of recovery items from a plurality of source recovery storage systems for a plurality of clients concurrently;

in response to receiving the group recovery request, identifying by a restore module executed by a processor of a backup management server, a group recovery resource based on the group recovery request, wherein the group recovery resource is previously configured by a configuration module executed by the processor of the backup management server based on a plurality of client requests, wherein the group recovery resource includes a plurality of recovery item lists, wherein the plurality of recovery item lists correspond to recoveries by the plurality of clients over a network, wherein a first of the plurality of recovery item lists corresponds to a recovery of a first one or more data items from a first of the plurality of source recovery storage systems to a first of a plurality of target recovery storage systems associated with a first of the plurality of clients, wherein a second of the plurality of recovery item lists corresponds to a recovery of a second one or more data items from a second of the plurality of source recovery storage systems to a second of the plurality of target recovery storage systems associated with a second of the plurality of clients, and wherein the group recovery resource further includes a duplicate option specifying how to handle duplicate files on a target recovery storage system, the duplicate option being selected from a group consisting of renaming recovered files, not recovering files, and overwriting existing files, traversing by the restore module executed by the processor of the backup management server, the plurality of recovery item lists of the group recovery resource to determine the first and the second of the plurality of source recovery storage systems, the first and the second of the plurality of target recovery storage systems corresponding to the first and the second of the plurality of clients, respectively, and the first and the second one or more data items to be recovered to the first and the second target recovery storage systems, and initiating by the restore module executed by the processor of the backup management server, a plurality of recovery sessions to recover the data items from the first and the second of the plurality of source recovery storage systems to the respective first and the second of the plurality of target recovery storage systems of the plurality of clients concurrently.

14. The system of claim 13, wherein each of the recovery item lists corresponds to one of the plurality of target recovery storage systems.

15. The system of claim 13, wherein each of the recovery item lists further specifies a starting time at which a corresponding recovery session is to be performed.

16. The system of claim 15, wherein initiating a plurality of recovery sessions comprises transmitting a recovery command to the first and the second of the plurality of source recovery storage systems, the command specifying the plurality of recovery sessions to be performed at a specific starting time.

17. The system of claim 13, wherein each of the recovery item lists further includes information specifying a type of recovery, which is one of a file system recovery, a block-based recovery, and a snapshot-based recovery.

18. The system of claim 13, wherein the operations further comprise:
- receiving a status report from each of the plurality of recovery target storage systems describing an operating system of a corresponding recovery session; and
- storing the status report in a persistent storage device of the server.

* * * * *